No. 728,815. PATENTED MAY 19, 1903.
P. WILBURG.
HORSESHOE.
APPLICATION FILED NOV. 13, 1902.
NO MODEL.
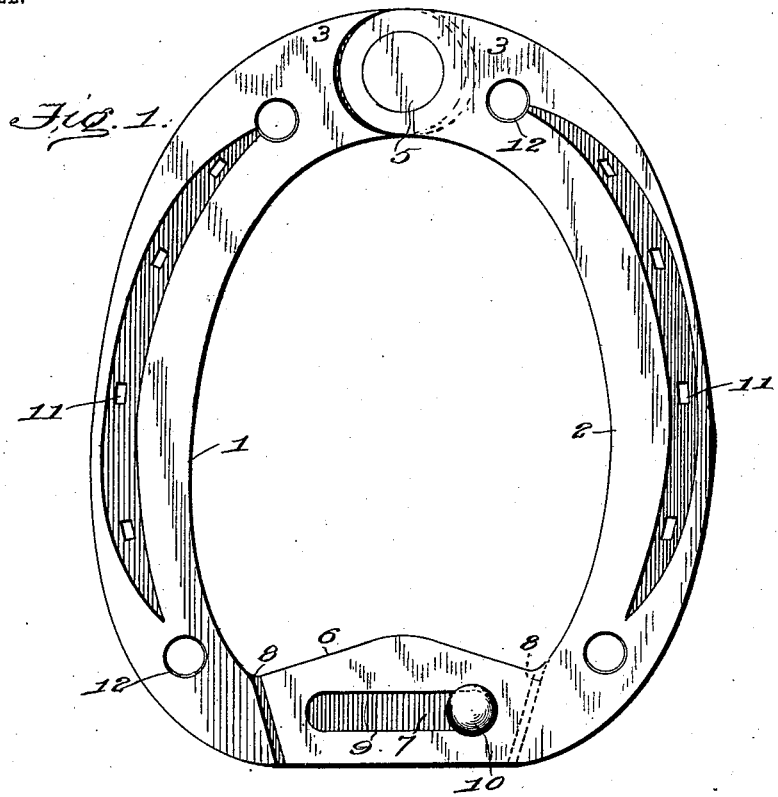
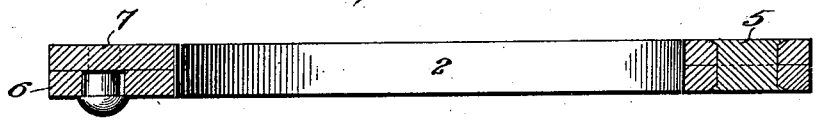
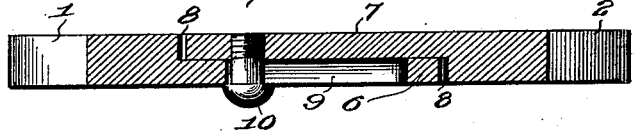
Inventor
Paul Wilburg,
Witnesses
G. Howard Walmsley,
Watts T. Estabrook
By
his Attorney.

No. 728,815. Patented May 19, 1903.

UNITED STATES PATENT OFFICE.

PAUL WILBURG, OF NEW ULM, MINNESOTA.

HORSESHOE.

SPECIFICATION forming part of Letters Patent No. 728,815, dated May 19, 1903.

Application filed November 13, 1902. Serial No. 131,241. (No model.)

*To all whom it may concern:*

Be it known that I, PAUL WILBURG, a citizen of the United States, and a resident of New Ulm, in the county of Brown and State of Minnesota, have invented a new and useful Improvement in Horseshoes, of which the following is a specification.

My invention relates to an improvement in horseshoes; and its purpose is to expand contracted hoofs, it being an expansible shoe made in two sections hinged together at the toe and having sliding connection with each other at the heel, whereby the shoe is strengthened and supported at the heel as well as at the toe; and in addition to the features herein mentioned the invention consists in certain other novel features of construction and combinations of parts, which will be hereinafter described, and pointed out in the claim.

In the accompanying drawings, Figure 1 is a bottom view. Fig. 2 is a longitudinal sectional view, and Fig. 3 is a transverse section through the heel extension-plates.

The shoe is composed of sections 1 and 2, which when together form a horseshoe of the usual form. At the toe the sections are offset on opposite sides, as shown at 3 3, whereby to fit together so that their outer surfaces are flush, and at this point the sections are hinged together by a pin or rivet 5, which is preferably countersunk, so that its ends are flush with the surfaces of the shoe.

Extension-plates 6 and 7 extend inwardly from the heels, one being integral with each section. These extension-plates are offset on their adjacent surfaces, whereby to fit each other, and shoulders 8 8 are formed at their ends nearest the heels for the abutment of the outer ends of the extension-plates. One of these extension-plates is provided with an elongated slot 9, which extends lengthwise thereof, and a pin or rivet 10 extends through this slot into the other plate, whereby to permit a free sliding movement for the adjustment of the shoe to the hoof and to permit of its expansion with the expansion of the hoof.

The shoe of course is provided with the usual nail-holes 11 11, and it also preferably has threaded holes 12 12 for the reception of patent calks well known on the market.

In the use of my improved horseshoe the hoof is pared down in the usual manner, and the shoe is nailed on like an ordinary bar-shoe, with plenty of bearing on the frog. The hoof must be kept soft and the horse in motion, as otherwise, if the hoof is not softened and the horse exercised, the hoof cannot be spread with any kind of power; but by this method and the use of my improved shoe, while the hoof is being protected the same as by any shoe, it is not constricted as by the ordinary rigid shoe, but is permitted to expand as nature dictates.

It it evident that slight changes might be resorted to in the several parts described without departing from the spirit and scope of my invention, and hence I do not wish to limit myself to the exact construction herein set forth; but, Having fully described my invention, what I claim as new, and desire to secure by Letters Patent, is—

A horseshoe comprising two sections pivotally secured to one another at the toe, each section provided at the heel with an inwardly-projecting extension-plate, the extension-plates overlapping each other, one of the extension-plates provided with a slot, the walls of which slot are plane or even and the other extension-plate provided with a stud loosely and slidably received in the slot, the two sections adapted to automatically expand with the expansion of the hoof to which the shoe is secured.

In testimony whereof I have signed this specification in the presence of two subscribing witnesses.

PAUL WILBURG.

Witnesses:
HENRY N. SOMSEN,
H. L. HOIDALE.